United States Patent [19]

Fullenkamp et al.

[11] 4,048,689
[45] Sept. 20, 1977

[54] MEAT CLEANING MACHINE

[75] Inventors: Anthony L. Fullenkamp, Fort Loramie; Herman F. Russell, Dayton, both of Ohio.

[73] Assignee: Hobart Corporation, Troy, Ohio

[21] Appl. No.: 659,473

[22] Filed: Feb. 19, 1976

[51] Int. Cl.² ............................................. A22C 17/08
[52] U.S. Cl. ........................................ 15/3.17; 15/77; 17/26
[58] Field of Search .......................... 15/3.16, 3.17, 77; 17/26; 29/125

[56] References Cited

U.S. PATENT DOCUMENTS 4,008,502  2/1977  Crane et al. ........................... 15/3.17

Primary Examiner—Edward L. Roberts
Attorney, Agent, or Firm—Biebel, French & Nauman

[57] ABSTRACT

A meat cleaning machine having an improved meat driving cylinder which includes a series of concentrically arranged, axially spaced, meat driving rings having outwardly projecting teeth which define the outer surface of the cylinder, and a supporting framework which consists of a pair of ring-shaped end frames positioned axially outwardly of the meat driving rings and interconnected by a pair of cross members disposed outwardly of the periphery of the cylinder. Each end frame has a pair of spaced, outwardly opening slots and a single inwardly opening slot. The slots in each end frame are aligned and form seats to journal the ends of grooved rollers which receive the meat driving rings in their grooves to support them, space them axially of the cylinder and maintain them in concentric relationship to each other. Because of the inherent rigidity of the supporting framework as opposed to prior art structures of cantilevered design, the framework can be made of lighter construction while still providing increased rigidity with respect to the cantilevered design and improved ease of assembly and disassembly as well as freedom from interior cross members.

8 Claims, 5 Drawing Figures

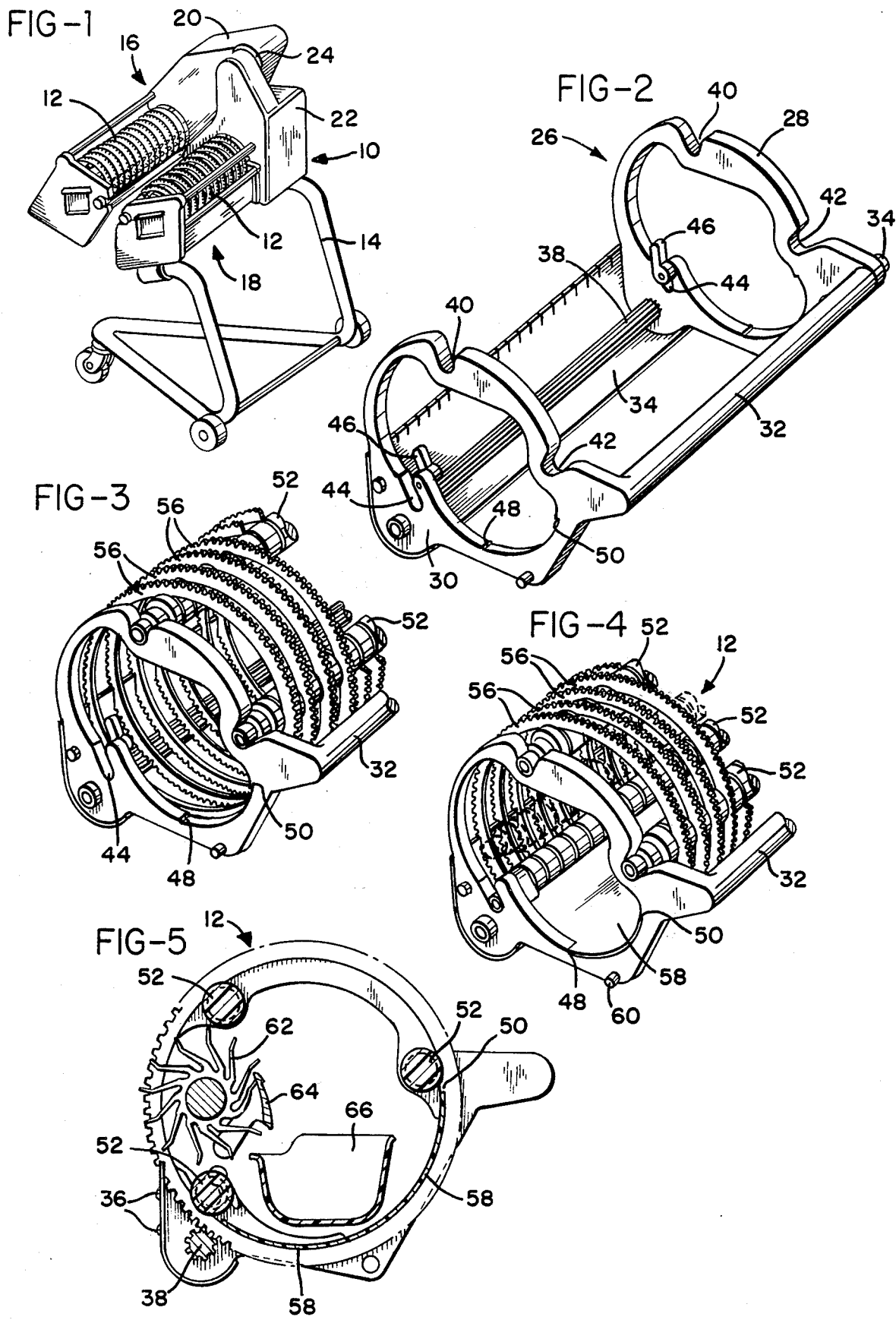

MEAT CLEANING MACHINE

CROSS REFERENCE TO RELATED APPLICATION

U.S. application Ser. No. 535,041, for MEAT GRIPPING AND MOVING CYLINDER AND MOUNT THEREFOR, filed Dec. 20, 1974, now abandoned.

BACKGROUND OF THE INVENTION

In the above noted co-pending application, assigned to the assignee of this application, an improved meat cleaning machine is disclosed in which a pair of meat driving cylinders engage a piece of meat and drive it past meat cleaning brushes positioned within the cylinders which quickly and efficiently clean the surfaces of the meat of bone dust and other undesirable material which they collect during the meat sawing and cutting process.

The meat driving cylinders of the above noted machine were designed as an improvement over prior art structures of the type shown, for example, in U.S. Pat. No. 3,781,936, issued Jan. 1, 1974, wherein the meat driving cylinders are formed with a supporting framework which consists of a pair of end rings interconnected by elongated, arcuate positioning shields. When it is desired to disassemble these cages they must be unbolted using appropriate tools.

To avoid this the machine of the above noted co-pending application is constructed such that the meat driving cylinders are provided with frameworks which consist of a main end member and a pair of cross pieces cantilevered outwardly therefrom. The cross pieces carry at their outer ends upper and lower end pieces which provide seats in alignment with seats on the main end member for internal supports for the meat engaging rings.

With this construction the casting for the ring support must necessarily be fairly substantial because of its cantilevered construction. Despite this there is still some flexure of the cross members when sufficient bending forces are applied to them.

Additionally, in that design at least one of the cross members must be positioned within the interior of the cylinder. This is undesirable, both from the standpoint of cleanliness and because it occupies space in the cylinder which also must accommodate other elements of the apparatus, such as the meat cleaning brushes, a collecting tray and a doctor blade.

SUMMARY OF THE INVENTION

In a meat cleaning machine in accordance with the present invention, meat driving cylinders are provided having interior supporting frameworks which are stronger, lighter in weight and easier to assemble and disassemble than prior art structures and are free of interior cross pieces.

Thus, in the meat driving cylinder of the present invention, a pair of similar, ring-shaped end members are interconnected by a pair of cross members to form a rigid supporting framework. In the assembled meat driving cylinder, the end members are positioned axially outwardly of the rings supported by the framework and the cross pieces are positioned radially outwardly of the periphery of the cylinder. This provides the stronger, light weight structure referred to above and yet eliminates the use of an internal cross piece.

Each of the end supports is provided with a pair of outwardly opening slots angularly spaced about the axis of the cylinder and an inwardly opening slot disposed on an opposite side of the axis of the cylinder. The slots in each end member are aligned to provide aligned sets of slots and each set of slots journals the ends of a grooved supporting roller. The grooves formed in the periphery of the rollers receive the meat engaging rings of the cylinder, supporting them, spacing them axially of the cylinder and establishing their concentric relationship to each other.

With this construction the cylinder may be assembled by slipping two of the grooved rollers through the rings and then dropping the rollers into place with their ends journalled in the aligned outwardly opening slots, and the rings are then positioned in the grooves in the rollers.

Thereafter the third roller is inserted through the interior of the cylinder and, with the rings received in the grooves formed in the surface of the third roller, its ends are journalled in the aligned, inwardly opening slots and locked in place by a simple, over center cam lock. Disassembly, of course, proceeds in exactly the reverse manner. Thus, it will be apparent that assembly and disassembly of the meat driving cylinders is greatly simplified in comparison with prior art structures of this type.

BRIEF DESCRIPTION OF THE DRAWINGS

FIG. 1 is a perspective view of a meat handling machine incorporating the meaat driving cylinder of the present invention;

FIG. 2 is a perspective view of the ring supporting framework of the meat driving cylinder;

FIG. 3 is a perspective view of a portion of the meat driving cylinder during a first step of the assembly thereof;

FIG. 4 is a view similar to FIG. 3, but showing the fully assembled cylinder; and FIG. 5 is a cross-sectional view through the cylinder and associated equipment.

DESCRIPTION OF THE PREFERRED EMBODIMENT

A machine 10 incorporating the meat driving cylinders 12 of the present invention is shown in FIG. 1 of the drawings. It may include a base 14, on rollers if desired, and a pair of meat handling units 16 and 18. Each meat handling unit includes one of the meat driving cylinders 12 and associated equipment within the cylinders, with the cylinders being driven by means of a motor enclosed in a housing 20, connected by means of chains and sprockets to a drive shaft within a housing 22. Housing 22 is journalled to housing 20 at 24 and unit 16 is urged by gravity toward unit 18 to accommodate pieces of meat of varying thicknesses, all as explained in detail in the above noted co-pending application.

Each of the cylinders 12 includes, as best seen in FIG. 2 of the drawings, a ring supporting framework 26 including a pair of opposed, one-piece, centrally open end frames 28 and 30 interconnected by cross members 32 and 34. Cross member 32, which may also serve as a handle, is of bar-like construction and may be cast integrally with the end frame 30 and bolted, as at 34, to the end frame 28.

Cross member 34 is preferably of sheet metal construction, such as stainless steel, bolted or attached by screws to each of the end frames as indicated at 36 in FIG. 5 of the drawings. Additionally, although not part of the framework per se, a drive pinion 38 is rotatably mounted to the end frames and driven by the cylinder driving means contained in the housing 20 or 22 through a suitable coupling, not shown.

It will also be seen that each end frame includes a pair of outwardly opening slots 40 and 42 angularly spaced about the axis of the cylinder 12 and a third, inwardly opening slot 44 on an opposite side of the axis of the cylinder to the outwardly opening slots, and having associated therewith an overcenter cam locking mechanism 46. Additionally, it will be noted that each of the end frames is notched, as at 48 and 50, for a purpose to be described presently.

Like slots 40, 42 and 44 in opposing end frames are aligned to define sets of slots receiving the ends of rollers 52, and each roller 52 is provided with a series of regularly spaced grooves 54 formed in the periphery thereof.

To assemble the cylinder of the present invention after, for example, cleaning or maintenance, the supporting framework may be placed on a table or other supporting structure in substantially the position shown in FIGS. 2 through 5 of the drawings and two of the rollers 52 inserted through the meat driving rings 56.

The rollers 52 are then dropped in place in the supporting framework with their ends received in the slots 40 and 42, as best seen in FIG. 3 of the drawings, and the rings 56 are then positioned in the grooves 54. It will be noted that because there are no internal cross members on the supporting framework the rollers and rings may be simply dropped into place.

Thereafter, a third roller 52 is inserted into the interior of the cage and dropped into place with its ends journalled in the slots 44 and the inner edges of the rings 56 received in its grooves 54, spacing the rings axially of the cylinder and maintaining them in concentric relationship to each other.

The overcenter cam locks are then flipped in a clockwise direction from the position shown in FIG. 2 to the position shown in FIGS. 4 and 5 with their lobes overlying the ends of the third roller 52 so that any forces tending to dislodge the third roller from its slots 44 acts to hold the lock 46 more firmly in place. The upper rollers 52 are, of course, held in their slots 40 and 42 by the rings 56. It will also be noted that a shield 58 may be positioned within the cylinder with its edges engaged in the notches 48 and 50.

After assembly each of the cylinders 12 can then be positioned in a meat handling unit, studs 60 being received in suitable seats formed in the machine, and thereafter a rotary meat cleaning brush 62, a doctor blade 64 and a refuse tray 66 can be positioned within the open central portion of the cylinder, all as described in detail in the above noted co-pending application.

From the above, it will be seen that the present invention provides improved meat driving cylinders for a meat handling machine which are of light weight rigid construction, capable of simplified assembly and disassembly and free of internal cross members.

While the form of apparatus herein described constitutes a preferred embodiment of the invention, it is to be understood that the invention is not limited to this precise form of apparatus, and that changes may be made therein without departing from the scope of the invention.

What is claimed is:

1. In a meat handling machine having a centrally open meat driving cylinder including a plurality of axially aligned and spaced meat driving rings each having outwardly projecting teeth, means for driving said cylinder about the axis thereof and meat cleaning means positioned within said cylinder to clean the surface of a piece of meat engaged by said teeth, the improvement comprising:
   a. a ring supporting framework consisting of:
      i. a pair of opposed, one piece, centrally open end frames positioned axially outwardly of said rings, and
      ii. means interconnecting said end frames, extending axially of said cylinder and positioned solely outside the periphery thereof,
   b. each of said end frames including at least three seats angularly spaced about said axis of said cylinder with the seats on one end frame aligned with those on the other end frame to form at least three sets of aligned seats,
   c. at least one of said sets of seats being positioned on an opposite side of said axis of said cylinder from the others of said sets of seats, and
   d. at least three ring support members, each having the ends thereof received and mounted in said end frames with said ring support members having portions engaging inwardly disposed surfaces of said meat driving rings in supporting relationship thereto.

2. The machine of claim 1 wherein:
   a. said end frames are substantially ring shaped.

3. The machine of claim 1 wherein:
   a. said ring support members include means spacing said rings axially of said cylinder.

4. The machine of claim 1 wherein:
   a. said ring support members are rollers journalled at their ends in said seats.

5. The machine of claim 4 wherein:
   a. said ring engaging portions of said ring support members comprise peripheral grooves formed in said rollers and receiving and spacing said rings axially of said cylinder with bottoms of said grooves maintaining said rings in concentric relationship to each other.

6. The machine of claim 1 wherein:
   a. said end frame interconnecting means comprises a pair of cross members.

7. The machine of claim 1 wherein:
   a. said sets of seats comprises two sets of slots opening radially outwardly of said end frames, and
   b. one set of slots opening inwardly of said end frames.

8. In a meat handling machine having a centrally open meat driving cylinder including a plurality of axially aligned and spaced meat driving rings each having outwardly projecting teeth, means for driving said cylinder about the axis thereof and meat cleaning means positioned within said cylinder to clean the surface of a piece of meat engaged by said teeth, the improvement comprising:
   a. a ring supporting framework consisting of:
      i. a pair of opposed, centrally open, continuous, substantially ring shaped end frames positioned axially outwardly of said rings, and
      ii. a pair of cross members positioned solely outside the periphery of said cylinder and constituting the sole means interconnecting said end frames,
   b. each of said end frames having:

i. a pair of outwardly opening slots angularly spaced about said axis of said cylinder, and
ii. an inwardly opening slot positioned on an opposite side of said axis of said cylinder from said outwardly opening slots,
iii. said outwardly and inwardly opening slots on one of said end frames being aligned with said outwardly and inwardly opening slots on the other of said end frames and constituting sets of aligned, outwardly and inwardly opening slots, c. a plurality of rollers having the ends thereof journalled in said sets of slots in said end frames,
d. means for locking ends of one of said rollers in said set of inwardly opening slots with the ends of the remaining rollers held in said outwardly opening slots by said rings, and
e. means defining continuous grooves in the peripheries in each of said rollers receiving said rings, spacing them axially of said cylinder and maintaining them in concentric relationship to each other.

* * * * *